(12) United States Patent
Davenport, Jr.

(10) Patent No.: US 8,560,718 B2
(45) Date of Patent: Oct. 15, 2013

(54) WIRED INTERNET NETWORK SYSTEM FOR THE INTERNET VIDEO STREAMS OF RADIO STATIONS

(76) Inventor: Ronald R. Davenport, Jr., Pittsburgh, PA (US)

( * ) Notice: Subject to any disclaimer, the term of this patent is extended or adjusted under 35 U.S.C. 154(b) by 111 days.

(21) Appl. No.: 12/716,620

(22) Filed: Mar. 3, 2010

(65) Prior Publication Data

US 2010/0228877 A1 Sep. 9, 2010

Related U.S. Application Data

(60) Provisional application No. 61/157,000, filed on Mar. 3, 2009.

(51) Int. Cl.
| | | |
|---|---|---|
| G06F 21/00 | (2013.01) |
| G06F 7/00 | (2006.01) |
| G06F 17/30 | (2006.01) |
| G06F 15/16 | (2006.01) |
| G06F 15/167 | (2006.01) |
| G06F 15/177 | (2006.01) |
| G06F 15/173 | (2006.01) |
| G06F 17/00 | (2006.01) |
| G06F 3/00 | (2006.01) |
| H04N 7/167 | (2011.01) |
| H04N 7/10 | (2006.01) |
| H04N 7/173 | (2011.01) |
| H04N 7/16 | (2011.01) |

(52) U.S. Cl.
USPC ......... 709/231; 705/58; 705/59; 707/769; 707/805; 709/203; 709/205; 709/212; 709/218; 709/248; 715/201; 715/716; 715/723; 715/747; 715/760; 725/31; 725/34; 725/38; 725/56; 725/105; 725/112; 725/117; 725/135

(58) Field of Classification Search
None
See application file for complete search history.

(56) References Cited

U.S. PATENT DOCUMENTS

| | | | |
|---|---|---|---|
| 6,002,393 A | 12/1999 | Hite et al. | |
| 6,056,555 A * | 5/2000 | Tada | 434/307 A |
| 6,560,400 B1 * | 5/2003 | Sumiyoshi et al. | 386/201 |
| 6,912,398 B1 * | 6/2005 | Domnitz | 455/461 |
| 7,324,166 B1 * | 1/2008 | Joslin et al. | 348/722 |
| 7,512,886 B1 * | 3/2009 | Herberger et al. | 715/723 |
| 8,280,949 B2 | 10/2012 | Bergquist et al. | |
| 2002/0087496 A1 * | 7/2002 | Stirpe et al. | 706/45 |
| 2003/0079222 A1 * | 4/2003 | Boykin et al. | 725/31 |
| 2003/0179317 A1 * | 9/2003 | Sigworth | 348/515 |
| 2004/0205829 A1 * | 10/2004 | Hane, III | 725/135 |
| 2005/0012598 A1 * | 1/2005 | Berquist | 340/425.5 |
| 2005/0210101 A1 * | 9/2005 | Janik | 709/203 |

(Continued)

OTHER PUBLICATIONS

International Preliminary Report on Patentability for PCT/US2010/026039 dated Sep. 6, 2011, (Form PCT/IB/373, PCT/ISA/237).

(Continued)

Primary Examiner — Ario Etienne
Assistant Examiner — Ho Shiu
(74) Attorney, Agent, or Firm — Buchanan Ingersoll & Rooney PC

(57) ABSTRACT

The present invention provides multi media video streams via high speed internet to a worldwide audience by using a specialized automation system with audio and video switching capabilities. This system provides video media streams to multiple platforms such as, cell phones, internet websites, and cable television subscribers.

3 Claims, 2 Drawing Sheets

(56) References Cited

U.S. PATENT DOCUMENTS

| | | | |
|---|---|---|---|
| 2005/0259694 A1 | 11/2005 | Garudadri et al. | |
| 2006/0034266 A1* | 2/2006 | Harris et al. | 370/356 |
| 2006/0092282 A1* | 5/2006 | Herley et al. | 348/207.99 |
| 2006/0210157 A1* | 9/2006 | Agnihotri et al. | 382/173 |
| 2006/0248209 A1* | 11/2006 | Chiu et al. | 709/231 |
| 2006/0288395 A1 | 12/2006 | DiLorenzo | |
| 2007/0073585 A1* | 3/2007 | Apple et al. | 705/14 |
| 2007/0283033 A1* | 12/2007 | Bloebaum et al. | 709/231 |
| 2008/0052368 A1* | 2/2008 | Rahkonen et al. | 709/212 |
| 2008/0092047 A1* | 4/2008 | Fealkoff et al. | 715/716 |
| 2008/0101454 A1 | 5/2008 | Luff et al. | |
| 2008/0120546 A1* | 5/2008 | Pulier | 715/716 |
| 2008/0140573 A1* | 6/2008 | Levy et al. | 705/58 |
| 2008/0208692 A1* | 8/2008 | Garaventi et al. | 705/14 |
| 2008/0209482 A1* | 8/2008 | Meek et al. | 725/105 |
| 2008/0235085 A1* | 9/2008 | Kovinsky et al. | 705/14 |
| 2008/0242221 A1* | 10/2008 | Shapiro et al. | 455/3.06 |
| 2008/0242280 A1* | 10/2008 | Shapiro et al. | 455/414.3 |
| 2008/0254835 A1* | 10/2008 | Mellqvist | 455/559 |
| 2008/0256115 A1* | 10/2008 | Beletski et al. | 707/102 |
| 2008/0320074 A1* | 12/2008 | Jones | 709/203 |
| 2009/0081950 A1* | 3/2009 | Matsubara et al. | 455/3.06 |
| 2009/0128335 A1* | 5/2009 | Leung | 340/572.1 |
| 2009/0164875 A1* | 6/2009 | Rance et al. | 715/201 |
| 2009/0183205 A1* | 7/2009 | McCartie et al. | 725/56 |
| 2009/0183215 A1* | 7/2009 | McCartie et al. | 725/105 |
| 2009/0204640 A1* | 8/2009 | Christensen et al. | 707/104.1 |
| 2009/0215416 A1* | 8/2009 | Devore | 455/185.1 |
| 2009/0307199 A1* | 12/2009 | Goodwin | 707/4 |
| 2010/0042235 A1* | 2/2010 | Basso et al. | 700/94 |
| 2010/0114934 A1* | 5/2010 | Martensson | 707/769 |
| 2010/0138561 A1 | 6/2010 | Church | |
| 2010/0141838 A1* | 6/2010 | Steggles | 348/512 |
| 2010/0146411 A1* | 6/2010 | Burnett et al. | 715/760 |
| 2010/0153572 A1* | 6/2010 | Feig et al. | 709/231 |
| 2010/0158470 A1* | 6/2010 | Tzoukermann et al. | 386/46 |
| 2010/0180297 A1* | 7/2010 | Levine et al. | 725/38 |
| 2010/0198860 A1* | 8/2010 | Burnett et al. | 707/769 |
| 2010/0217837 A1* | 8/2010 | Ansari et al. | 709/218 |
| 2010/0274820 A1* | 10/2010 | O'Brien et al. | 707/805 |
| 2010/0322596 A9* | 12/2010 | Pedlow, Jr. | 386/285 |

OTHER PUBLICATIONS

International Search Report for PCT/US2010/026039 dated Apr. 26, 2010, (Forms PCT/ISA/220 and PCT/ISA/210).

Written Opinion of the International Searching Authority for PCT/US2010/026039 dated Apr. 26, 2010, (Form PCT/ISA/237).

* cited by examiner

WIRED INTERNET NETWORK SYSTEM FOR THE INTERNET VIDEO STREAMS OF RADIO STATIONS

CROSS-REFERENCE TO RELATED APPLICATIONS

This application claims priority to U.S. Provisional Patent Application Ser. No. 61/157,000, filed Mar. 3, 2009. That document is incorporated by reference herein.

FIELD OF THE INVENTION

This invention relates to a method and system for producing and transmitting over the Internet a synchronized audio and video stream corresponding to the audio stream of an over-the-air radio station.

BACKGROUND OF THE INVENTION

Within the radio industry, a "wired" network is a network that delivers commercials at pre-set times on a pre-determined list of radio stations. This is in contrast with an "unwired" network which delivers commercials to a pre-determined list of radio stations but allows each individual radio station to determine when it will broadcast the commercials.

Each member of the network is called an "affiliate." In the case of a wired network, the network contracts with each affiliate to broadcast the same commercial at a pre-set time, combines the audience of each affiliate at that time into a network commercial, and then sells the network commercial to national advertisers. (For example, if there are 400 affiliates each having an audience of 100 at 6 a.m., the 6 a.m. network commercial would have an audience of 400×100 or 40,000.)

In the marketplace for advertising, there are six basic choices: print, radio, outdoor, broadcast television, cable, and Internet. Advertising attempts to capture the attention of consumers through the focal points of "sight," "sound," and "motion." Each of the six advertising choices has its strengths and weaknesses, but only broadcast television, cable and Internet have the ability to capture all three advertising focal points.

Radio stations, radio networks, broadcast television stations, and cable systems all broadcast commercials, and the commercials typically range from fifteen to thirty to sixty seconds in length. The price of a commercial will vary based upon, among other factors, the size of the audience reached by the medium. Audience size is measured by Nielsen for broadcast television and cable, and by Arbitron for radio stations and network radio.

Arbitron uses a diary method for measuring audience of radio stations. Arbitron mails diaries to listeners in each market, the listeners then record the stations that they listen to over the course of a one week period and then send the diaries back to Arbitron, and Arbitron tabulates the responses. (Arbitron is moving toward an electronic measuring tool called the Personal People Meter ("PPM") and plans to implement PPM in the top 50 markets over the next several years, and has already implemented PPM in Philadelphia, Houston, New York, Chicago and Los Angeles later this year.) Arbitron will include the audience from a radio station's web stream provided that the radio station streams one hundred percent of everything broadcast terrestrially (i.e., over the radio spectrum) in its entirety (including commercials).

Radio networks use a separate audience measuring service offered by Arbitron called RADAR. Radio networks that subscribe to RADAR also must identify the radio stations that broadcast their commercials and the times that each station is scheduled to broadcast each commercial.

Many radio stations stream their entire broadcasts in real time over the Internet. Broadcast television and cable channels currently do not stream their broadcasts in real time over the Internet. This is due to the market exclusivity of the program (i.e., in order to watch a program a viewer has to tune into a particular station or cable channel, whereas over the Internet anyone anywhere could watch the program; if a viewer could watch "Desperate Housewives" or "Wheel of Fortune" in real time on a website, the market exclusivity disappears, and the wider the distribution of the program, the value of a program to an individual television station or cable system decreases). In radio, on the other hand, there is no market exclusivity for music and in fact different radio stations may play the same songs in the same market at the same time.

Many radio stations use the Scott Studios System in order to schedule the music that they broadcast. The music is stored in a music library consisting of a file server containing digital copies of the music. The music director schedules in advance the music that the station will broadcast and the time that the music will air. For the radio stations that stream their broadcasts, computers convert the radio broadcast into a digital feed which is then streamed onto the Internet.

Each radio station has a loyal, measured and identifiable listening audience which is currently listening to the station via radio or the Internet. Many radio stations also are affiliated with one or more radio networks, and thus are already familiar with network requirements. The Internet represents a means to capture additional listeners and viewers and draw them away from broadcast and cable television at the expense of broadcast and cable television.

Because Internet usage can be measured exactly in real time, the audience (usage) numbers are fully measurable. Therefore, analysis of how many people accessed the stream and for how long can be measured precisely in real time rather than audience estimates used in all other media. (Currently, audience measurement services take a sample of the market and extrapolate audience composition and demographics from the sample.) Advertisers have long asked for accurate real time measurement of who their commercials actually reach. The Internet allows a website to make these calculations.

SUMMARY OF THE INVENTION

The system builds upon traditional network radio by adding videos and video commercials. Given all of the back office resources contained within a typical radio station, by adding a video component to the station's website the radio station is creating a new platform for advertising revenue to the radio station. With the addition of video, each radio station or affiliate could begin to sell commercials on its Internet stream. These commercials would be in addition to the commercials on its terrestrial broadcast.

The present invention provides multi media video streams via high speed internet to a worldwide audience by using a specialized automation system with audio and video switching capabilities. This system provides video media streams to multiple platforms such as, cell phones, internet websites, and cable television subscribers.

Several video sources are available as well with audio sources. Streaming video media player provides break placement for insertion of national commercials and video replacement into the streaming content.

The system will establish a wired Internet network in which the network provides each affiliate with the tools for streaming video. In exchange, the affiliate provides the network with (1) inventory on the affiliate's Internet stream, (2) inventory on the affiliate's terrestrial (over the airwaves) broadcast, and (3) payment of a license fee. The wired Internet network establishes a platform upon which the network as well as each affiliate can generate additional advertising revenue through the monetization of Internet video content.

DETAILED DESCRIPTION OF THE PREFERRED EMBODIMENTS

The system includes software which enables each radio station or affiliate in the network to allow the station to stream video simultaneously with its audio stream. That video can be either existing artist videos or listener generated videos. The software to allow streaming of audio and video already exists. Examples of suitable software are "StreamAudio.com," "AudioVideoWeb.com" and "Onstreammedia.com.". Each affiliate in the network is responsible for obtaining its own videos, maintaining its own website (including performance rights licenses), and addressing its broadband needs. Each affiliate provides to the network a predetermined amount of Internet inventory, terrestrial inventory, and a license fee for the software. Utilization of the software permits each affiliate to increase its saleable inventory of advertising opportunity by providing a mechanism to more effectively advertise on its Internet stream.

The system enables a network to combine the Internet inventory of each affiliate into a network modeled after traditional radio networks. The network Internet inventory is negotiated by contract and thus readily identifiable on an hourly basis by each affiliate and can be pre-sold in advance unlike remnant inventory.

The system provides the affiliates with an attractive bargain in which the affiliates increase their saleable advertising inventory for the cost of increasing their bandwidth and giving a predetermined amount of their terrestrial inventory to the new Internet network. The system permits the affiliates to target new sources of media revenue with a "sight, sound, and motion" product. Because radio listeners are already accustomed to hearing commercials, the present system imposes no additional modality changes to the ordinary listener experience. Other advantages of the system are that each affiliate has a measured audience reaching a targeted demographic, the platform is completely mobile, and any advertising that is sold is unrelated to search engines (i.e., it provides a potential new revenue stream).

In a presently preferred embodiment, the system includes (1) the addition of a second library for each radio station consisting of a file server which contains a digital copy of a music video for each song in the music library, (2) software to link each song in the music library to a video in the video library, and (3) software to allow the audio file from the music library to synchronize with the corresponding video file from the video library so as to allow both the audio file and the video file to be streamed at the same time.

Figure 1:
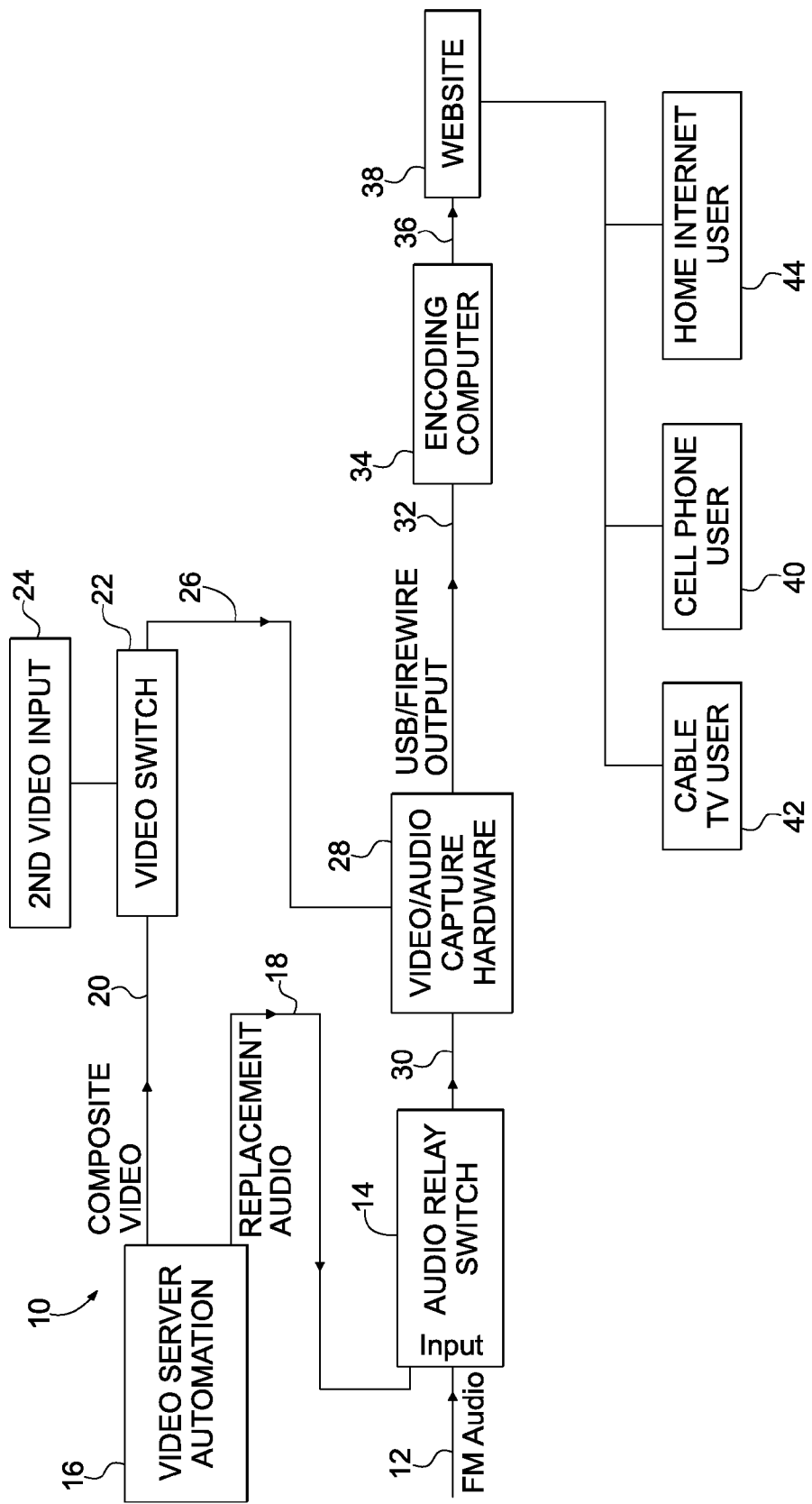
FIG. 1 is a schematic representation of the system of the present invention.

FIG. 1 shows a preferred embodiment of the wired internet network system 10. System 10 includes an over-the-air radio stream such as FM audio stream 12 which is post produced in the audio relay switch 14. This audio input 12 will be muted upon the event of a commercial break or such events that are not wanted to be internet broadcast by way of a command in the automation system. Videos, replacement videos and commercials are stored on the local hard drive of the video server 16. Videos are called upon and placed into the play list by a daily schedule of the on air automation system. Selected video commercials and audio will replace on air commercials and breaks via event relays. A replacement audio stream 18 can be used in place of the FM audio stream 12 for such purposes.

Video server 16 outputs composite video 20 which is directed to video switch 22. A second video source 24 can also be inputted to video switch 22. This second video input could include video from a webcam in the FM studio or live remotes. The output 26 from video switch 22 is directed to a video/audio capture hardware device 28 which also receives the output 30 from the audio relay switch 14. The video/audio capture hardware 28 receives the audio input from the FM air studio, post processed in the audio relay switch 14. Audio 30 from the FM studio will be muted upon the event of a commercial break where such events that are not wanted to be internet broadcast.

Output 32 from the video/audio capture hardware is directed to an encoding computer 34 which takes the audio and video input from the capture card in the capture hardware 28. Commercial grade video streaming software is installed in encoding computer 34 and compiles and compresses the video with synched audio into an internet media stream 36. Preferably, encoding computer 34 should be no less than AMD dual cord 5200 processor with 4 gigabytes RAM memory. The output 36 from encoding computer 30 is presented to the radio station's website 38 which will have an embedded media player that will open in a new fixed size window upon a user clicking on a streaming video link. Several links will be provided for use of viewing on multimedia devices such as cell phones and PDA's 40, cable TV 42 and home internet use 44.

Figure 2:
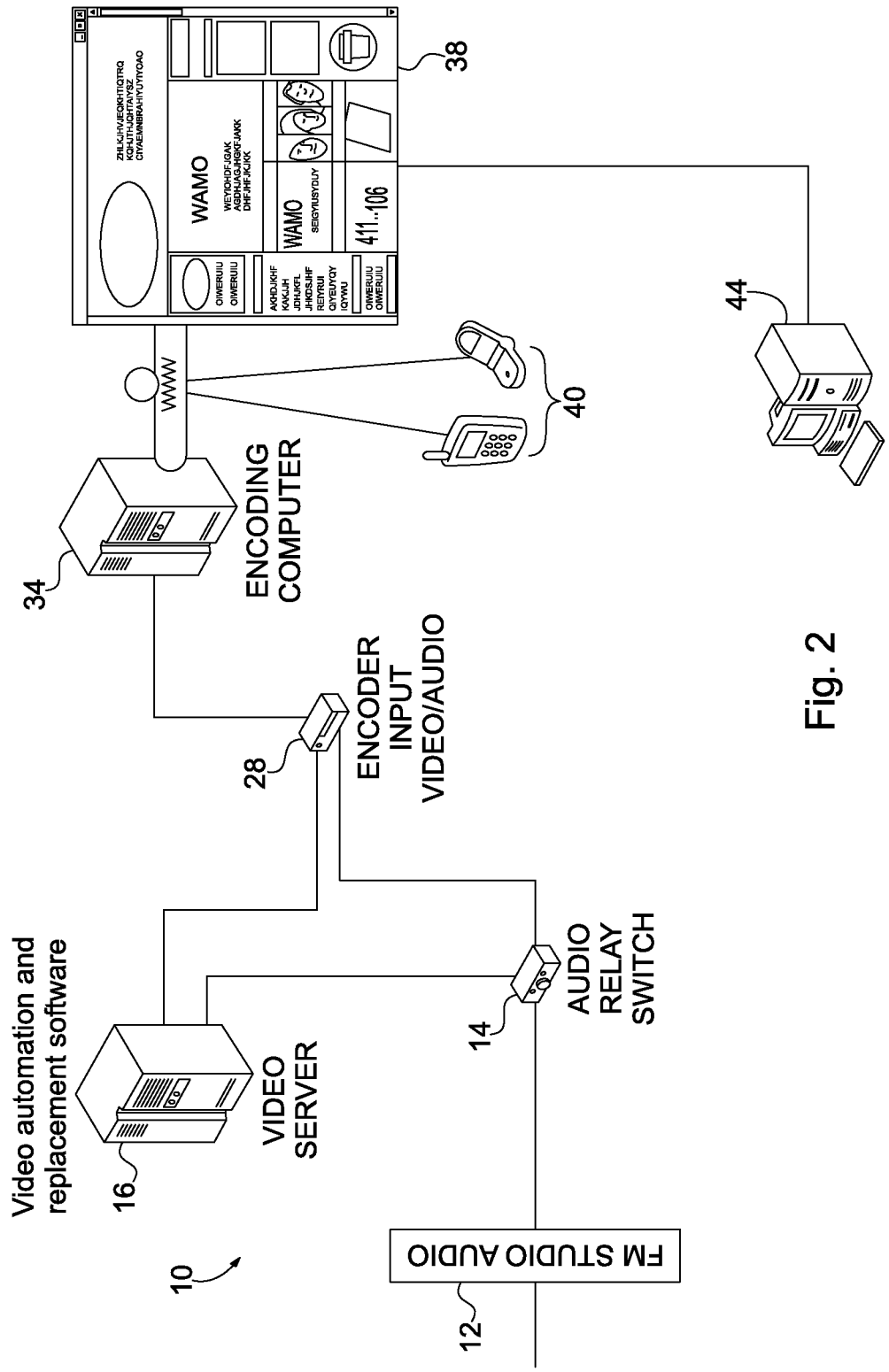
FIG. 2 is a schematic representation of the implementation of the system of the present invention.

FIG. 2 shows a schematic representation of a preferred embodiment of the system 10. FM studio audio 12 and output from video server 16 are directed to audio relay switch 14 which processes and synchronizes the signals to encoder input video/audio device 28. Encoding computer 34 compiles and compresses the video with synched audio which is delivered to portable devices 40 presented on website 38 and accessible to home internet users 44.

In an alternative embodiment, a central repository, such as a publicly or privately accessible website library, is used to hold all videos and commercials rather than video server 16. The repository streams the video or commercial to the individual station in response to a query request from that station. This embodiment eases the burden on the local station to develop, collect and/or maintain a separately housed video library and further permits the delivery of uniform video content from a network to its affiliates. The delivery of uniform video content makes it easier for the network to deliver its own commercials on the Internet stream of the affiliate.

Specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. Where examples are given, the description shall be construed to include but not to be limited to only those examples. It will be readily apparent to one skilled in the art that varying substitutions and modifications may be made to the invention disclosed herein without departing from the scope and spirit of the invention, and from the description of the inventions, including those illustratively set forth herein, it is manifest that various modifications and equivalents can be used to implement the concepts of the present invention without departing from its scope. A person of ordinary skill in the art will recognize that changes can be made in form and detail without departing from the spirit and the scope of the invention. The described embodiments are to be considered in all respects as illustrative and not restrictive.

I claim:

1. A method for producing real-time synchronized audio and video signals using an audio stream of an over-the-air radio station comprising the steps of:
   a. providing real-time audio content using an audio stream transmitted over the Internet from an over-the-air broadcast of a radio station;
   b. providing video content to the over-the-air broadcast of a radio station, wherein the video content comprises (i) a library of video content stored on a server (ii) live video feed of said over-the-air radio station and (iii) live video feed of a remote location corresponding to at least a portion of the audio content of the audio stream of the over-the-air radio station;
   c. accessing by said over-the-air radio station at least one of (i) a library of video content stored on a server (ii) live video feed of said over-the-air radio station and (iii) live video feed of a remote location corresponding to at least a portion of the audio content of the audio stream of the over-the-air radio station;
   d. processing the audio content and the corresponding video content by said over-the-air radio station to produce parallel synchronized audio and video signals in real-time to said audio stream transmitted by said over-the-air radio station; and
   e. transmitting in real time the parallel synchronized audio and video signals by said over-the-air radio station, wherein the parallel synchronized audio and video signals are transmitted simultaneously over the Internet via a website associated with the over-the-air radio station.

2. A system for producing real-time synchronized audio and video signals using an audio stream of an over-the-air radio station comprising:
   a. audio content from an audio stream transmitted from an over-the-air radio station;
   b. video content from (i) a library of video content stored on a server (ii) live video feed of said over-the-air radio station and (iii) live video feed of a remote location corresponding to at least a portion of the audio content of the audio stream of the over-the-air radio station and
   c. a processor accessed by said over-the-air radio station having access to at least one of (i) said library of video content stored on a server (ii) said live video feed of said over-the-air radio station and (iii) said live video feed of a remote location corresponding to at least a portion of the audio content from the audio stream of the over-the-air radio station, said processor producing a parallel synchronized audio and video signals in real-time from the audio content and the corresponding video content, wherein the parallel synchronized audio and video signals are transmitted simultaneously over the Internet by the over-the-air radio station via a website associated with said over-the-air radio station.

3. A library of video content for use in a system for producing real-time synchronized audio and video signals wherein audio content from an audio stream transmitted from an over-the-air radio station is processed with video content from (i) a library of video content stored on a server (ii) live video feed of said over-the-air radio station and (iii) live video feed of a remote location corresponding to at least a portion of the audio content of the audio stream of the over-the-air radio station, wherein said video content is accessed by said over-the-air radio station, said video content corresponding to at least a portion of the content of the audio stream of said over-the-air radio station to produce parallel synchronized audio and video signals in real-time from the audio content and the corresponding video content, wherein the parallel synchronized audio and video signals are transmitted simultaneously over the Internet by the over-the-air radio station via a website associated with said over-the-air radio station.

* * * * *